United States Patent Office 3,761,239
Patented Sept. 25, 1973

3,761,239
PROCESS FOR PRODUCING LAND-FILL COMPOSITIONS
Charles Calvin Cook, 1732 Roanoke Ave., Lakeland, Fla. 33803, and Erwin Mathew Haynsworth, 3922 Americana Drive, Tampa, Fla. 33614
Continuation-in-part of abandoned application Ser. No. 24,090, Mar. 31, 1970. This application Nov. 24, 1971, Ser. No. 201,898
Int. Cl. B01d 21/01
U.S. Cl. 71—33      14 Claims

ABSTRACT OF THE DISCLOSURE

Waste slimes and tailings from ore, particularly phosphate rock operations containing as an example, from about 6 to about 40 parts by weight on a dry basis of slimes, from about 60 to 90 parts by weight or a dry basis of tailings, and water in an amount sufficient to provide a moisture content of 15% to 30% based on total composition by weight, about 93% by weight on a dry basis of the solid particles of the composition having a particle size of minus 16 mesh. In other examples calcium sulfate is employed.

---

This application is a continuation-in-part of application Ser. No. 24,090, filed Mar. 31, 1970, now abandoned.

BACKGROUND OF THE INVENTION

Since valuable ore deposits often occur in nature intimately mixed with a variety of less valuable or desirable constituents, it is a primary function of the ore processing industry to remove or separate as much of these extraneous constituents from the desired ore as possible. The flotation process developed in the early 1930's has proven to be a valuable tool for assisting in the removal of unwanted waste products from ores and is in wide usage today in a variety of ore processing operations. However, since the development and utilization of the flotation process by the ore processing industry, disposal of the waste products resulting therefrom has presented a monumental problem. Basically these waste materials fall into two categories identified by those skilled in the ore processing art by the terms "slimes" and "tailings," respectively.

Slimes

The "slimes" are aqueous suspensions or dispersions of the ultrafine solid wastes most of which are ordinarily separated from the ore feed stream to the flotation step prior to carrying out the flotation step. These slimes are called primary slimes. This separation is typically carried out using cyclones, hydroseparators or other conventional equipment. Smaller amounts of slimes, i.e., secondary slimes, may also be separated from the ore in the flotation step itself. Generally, primary slimes will account for about 90% of the total slimes produced and secondary slimes for the remaining 10%.

Slimes may be more precisely defined as comprising an aqueous suspension of ultrafine soil solids associated with the ore such as, for example, clays, quartz, and mineral values, the solid particles of which are of sufficiently small particle size so that at least about 99% by weight of the solids (dry basis) passes through 150 mesh screen. Mesh sizes as used throughout this specification refer to the Tyler Standard Series. It is therefore apparent that substantially all, i.e. 99–100%, of the particles will possess a particle size which is less than about 105 microns. Although substantially all of the slime solids can be characterized in particle size as minus 150 mesh, it is to be understood that variation in the particle size distribution of the slimes can occur between slimes emanating from different ore processing operations such as, for example, phosphate and copper mining, as well as between slimes from the same type of mining operation, i.e. phosphate, in cases where the soil in which the ore is found varies from location to location. As a general rule, anywhere from 66% to 75% by weight of the slime solids will pass through 325 mesh screen, these minus 325 mesh particles having an average particle size less than about 44 microns; however, some slimes such as, for example, certain phosphate slimes, may contain as high as 98% minus 325 mesh particles. Typically, as much as 50% by weight of the solids may have a particle size which is below 10 microns.

Tailings

The "tailings" are the solid waste from the flotation step itself and are essentially water insoluble granular particles of soil which is associated with the ore which have a substantially larger particle size than the slime solids. The term "tailings" includes aqueous slurries of the waste solids as well as what are often referred to as "dewatered" tailings, which are solid wastes from which sufficient water has been removed by centrifugal separators or other conventional equipment to produce a moisture content in the solids of from about 20 to 30% by weight. Tailings typically comprise a mixture of from about 90 to 95% by weight (dry basis) of quartz and from about 5 to 10% by weight (dry basis) mineral values wherein at least 95% by weight (dry basis) of the solids possess an average particle within the range −16 to +150 mesh. Accordingly, at least 95% by weight average between about 105 and 1000 microns and a major portion of the tailings are generally larger than about 65 mesh. Although tailings solids will ordinarily fall within the particle size ranges given above, variation in the particle size distribution within this range can occur depending upon the nature of the soil in which the particular ore deposit occurs.

Slimes and tailings as defined above are produced as waste products in a hot of widely varying ore processing operations such as, for example, in copper mining, in the mining of heavy minerals such as titanium and rutile, and in virtually all non-metallic mining such as the mining of phosphate, potash, feldspar, clays, and fluorspar. For purposes of clarity, it becomes convenient to discuss this invention in terms of a particular ore processing industry although it must be understood, in view of the similarities which exist between the slimes and tailings from a variety of ore processing operations, that this invention is in no way limited to the slimes or tailings from the ore processing industry selected to exemplify this invention.

A principal generator of copious amounts of slimes and tailings is the phosphate rock processing industry, a substantial portion of which is located in the state of Florida. Slimes and tailings from such an operation can be conveniently referred to as phosphate slimes and phosphate tailings.

An extensive analysis and characterization of Florida phosphate slimes can be found in the Bureau of Mines Report of Investigations 6163 by J. H. Gary et al. which appeared in 1963 under the title, "Chemical and Physical Beneficiation of Florida Phosphate Slimes," and publication incorporated herein by reference. A typical size distribution screen analysis (dry basis) and a typical chemical analysis (dry basis) of a Florida phosphate slime are presented below:

| Screen analysis | | | | | | | | | |
|---|---|---|---|---|---|---|---|---|---|
| Mesh | +20 | −20 | −35 | −48 | −65 | −100 | −150 | −200 | −325 |
| Percent by weight | | | | | 100 | 99.85 | 99.65 | 99.20 | 98.30 |

CHEMICAL ANALYSIS

| Constituent: | Percent by weight |
|---|---|
| $P_2O_5$ | 10–20 |
| Bone phosphate of lime | 21–42 |
| $Fe_2O_3$ | 2–8 |
| $Al_2O_3$ | 5–20 |
| CaO | 10–20 |
| Insolubles (quartz) | 17–23 |

Florida phosphate slimes typically contain approximately ⅓ finely divided quartz, ⅓ finely divided fluoapatite, and ⅓ finely divided clays (primarily attapulgite). Such slimes generally contain very large amounts of extremely fine solid particles. In the screen analysis given above, for example, it can be seen that 98.3% by weight of the solids have a particle size of minus 325 mesh. It should also be noted that the slimes may contain small amounts of tailings. In the above screen analysis, for example, the slimes contained 0.35% tailings solids.

A typical size distribution screen analysis (dry basis) and a typical chemical analysis (dry basis) of Florida phosphate tailings are presented below:

| Screen analysis | | | | | | | | | |
|---|---|---|---|---|---|---|---|---|---|
| Mesh | +20 | −20 | −35 | −48 | −65 | −100 | −150 | −200 | −325 |
| Percent by weight | 1.2 | 98.8 | 85.1 | 53.1 | 19.0 | 8.0 | 3.4 | | |

CHEMICAL ANALYSIS

| Constituent: | Percent by weight |
|---|---|
| $P_2O_5$ | 0.5–2.5 |
| Bone phosphate of lime | 1.1–5.5 |
| $Fe_2O_3$ | 0.2–0.5 |
| $Al_2O_3$ | 0.1–0.3 |
| CaO | 0–1 |
| Insolubles (quartz) | 90–95 |

From the above screen analysis, it can be seen that 95.4% of the tailings solids have an average particle size within the range −20 to +150 mesh, a particle size range which is fairly typical of a Florida phosphate tailings. It should be noted that the tailings may contain small amounts of slimes as can be seen from the above screen analysis which shows a slimes solid content of 3.4%.

It is disposal of the tremendous amounts of slimes generated by ore processing plants which presents the greatest waste disposal problem and it is the solution of this problem to which this invention is primarily directed. Slimes present a problem because they retain substantial amounts of water and consequently their fluidity even after years of settling and, as a result, possess substantially no bearing strength whatever. Even after settling for many years, the slimes settle to only about 25–30% by weight solids and still possess a jelly like consistency. As such, the disposal site in which they are deposited becomes virtually useless and is an obvious hazard to passers-by. The slimes are typically disposed of by discharging them into excavations or, as is perhaps more common, into reservoirs or ponds which are formed by a constructed earthen damwork. The slimes are allowed to settle by gravity; the water which separates from the slimes during settling is usually recovered from the slimes settling pond for reuse in the ore processing plant.

Where dammed sites are utilized, the dams must be continuously maintained for when a dam fails, as they may occasionally do, the countryside and rivers surrounding the site are inundated with vast quantities of the jelly-like slimes resulting in pollution of the land and surrounding waterways. Moreover, when the slimes disposal area is filled, the site is nothing more than a liability. A crust may form on the surface of the site but a few inches below the surface, the slimes are a jelly-like mass, and obviously a serious hazard to anyone crossing the site. Backfilling over the surface may permit use of the filled up disposal site for limited agricultural use but use of heavy equipment and building on the site is not possible.

Because of the seriousness of this problem, the ore processing industry has over the past three-and-a-half decades continually sought an acceptable means of eliminating this problem. Over the years, investigators have proposed such slimes disposal techniques as consolidation by stage filling, solar heating, selective flocculation, pressure filtration and dewatering by electro-osmotic techniques, but heretofore none of these proposals have met with genuine success. This is manifestly evident from the fact that virtually every phosphate producer, for example, who utilizes a flotation system today still disposes of the slimes produced during processing of the phosphate rock in ponds in mined-out areas and/or in ponds created by the erection of earthen dams.

Disposal of tailings, while not as serious a problem as the disposal of slimes, is still a problem. The tailings have acceptable bearing strength when deposited in a firmly confined area but are essentially barren of plant nutrient, have practically no capacity for holding water, and are easily carried aloft by wind and eroded by storms. These properties present an obvious disadvantage to useful reclamation of these tailings disposal sites.

It is an object of this invention to provide a means for eliminating the substantial waste disposal problems attendant with presently used procedures for disposing of slimes and tailings and, in particular, to eliminate the safety hazards and land and water pollution hazards associated with such waste disposal procedures.

It is another object of this invention to provide a means whereby otherwise virtually useless slimes can be transformed into fertile soil having acceptable bearing strength so as to render such soil eminently suitable for purposes of land reclamation and pollution control.

SUMMARY OF THE INVENTION

This invention relates to a process for enhancing the rate at which water can be removed from the waste slimes of ore processing operations.

This invention also relates to a process for producing a fertile reconstituted soil of acceptable bearing strength which comprises admixing slimes having a critical solids content with prescribed amounts of tailings.

This invention also relates to various reconstituted fertile land-fill compositions of slimes and tailings such as those prepared in accordance with the above process.

In accordance with the present invention, it has been found that when slimes are admixed with tailings, the slimes dewater at a substantially greater rate than is achievable using gravity settling and, moreover, that the reconstituted slimes-tailings mixtures produced thereby are sufficiently fertile to support plant life and possesses acceptable bearing strength. By acceptable bearing strength is meant that the bearing strength of the reconstituted mixture will approach that of normal soil in the region from which the ore being processed originates. In general, an acceptable bearing strength means that the land will support animals and human beings, heavy equipment such as tractors and the like, and can be used for the construction of buildings and dwellings.

Figure 2:
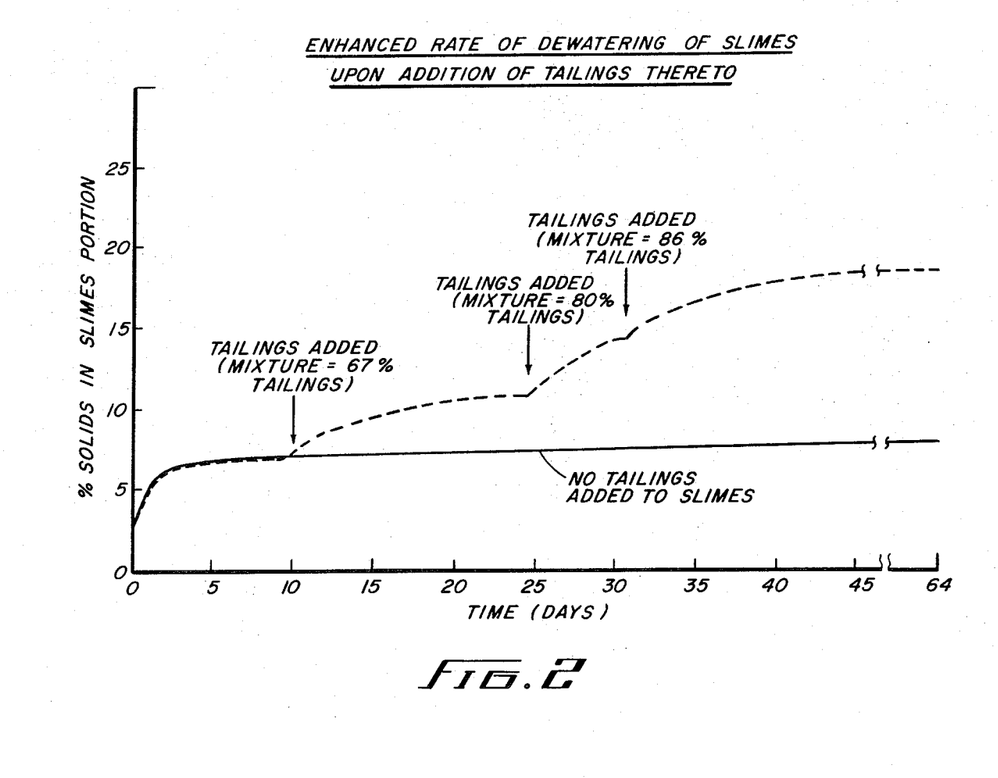
FIGS. 2, 3 and 4 represent graphically various examples of the invention.
Figure 3:
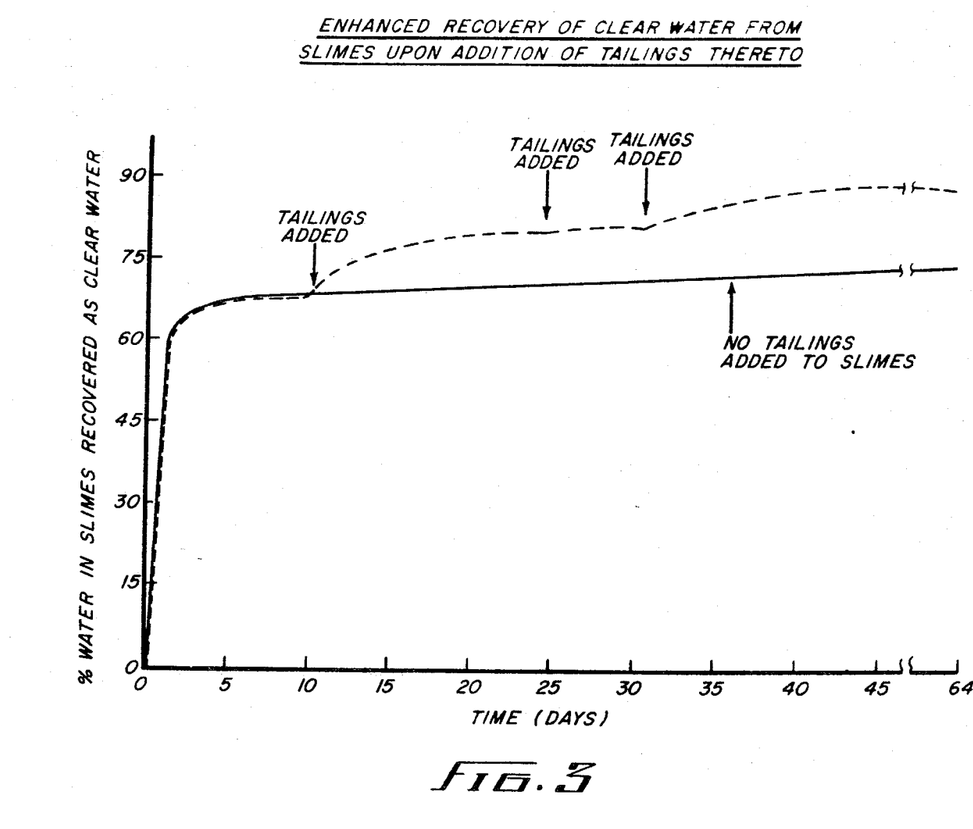

More particularly, it has been found that if the slimes are simply admixed with tailings that:

(1) There is a substantial enhancement in the rate at which the water is released from the slimes. This is best seen in FIG. 2 which is discussed more fully hereinbelow. For example, whereas slimes containing 2% solids will settle by gravity to only 7% solids after about 60 days, the addition of tailings to the slimes results in slimes containing 15% solids in 30 days and 20% solids in 60 days; and (2) Water is released from the slimes over a relatively short settling time in amounts substantially greater than was heretofore thought possible. This is best seen in FIG. 3 which is discussed more fully hereinbelow. For example, whereas slimes containing 2% solids after settling 60 days produced only 70% clear water, the same slimes upon addition of tailings thereto produced about 80% clear water after 30 days and 90% clear water after 60 days. The increased amount of water which the process of this invention now allows to be rapidly recovered from the slimes has the two fold advantage of making substantially more water available for recycle to the ore processing plant while simultaneously significantly reducing the acreage required for the slime disposal site.

If tailings are added to the slimes merely to enhance the rate at which the slimes are dewatered, the amount of solids present in the slimes is not critical. Typical waste slimes may contain from about 0.5% to about 10% solids and ordinarily will contain from about 1 to 5% solids. The slimes can achive a solids content higher than 10%, such higher concentrations usually being obtained by gravity settling of the slimes. For reasons made clear hereinbelow the slimes used in the process of this invention will preferably contain about 10% to about 25% solids.

Similarly, the amount of tailings added to enhance dewatering of the slimes is not critical. However, it is desirable to add tailings in an amount sufficient to provide a slimes-tailings mixture containing at least about 50% by weight tailings on a dry basis and, for reasons made clear hereinbelow, preferably 60% to 99% tailings.

The slimes and tailings can be admixed in any of a variety of standard techniques. A particularly convenient method is to repulp dewatered tailings with a thickened slime. The term "admixing" contemplates mixing by gravity settling of the tailings into the slimes as well as the more conventional means of mixing by agitation.

Figure 4:
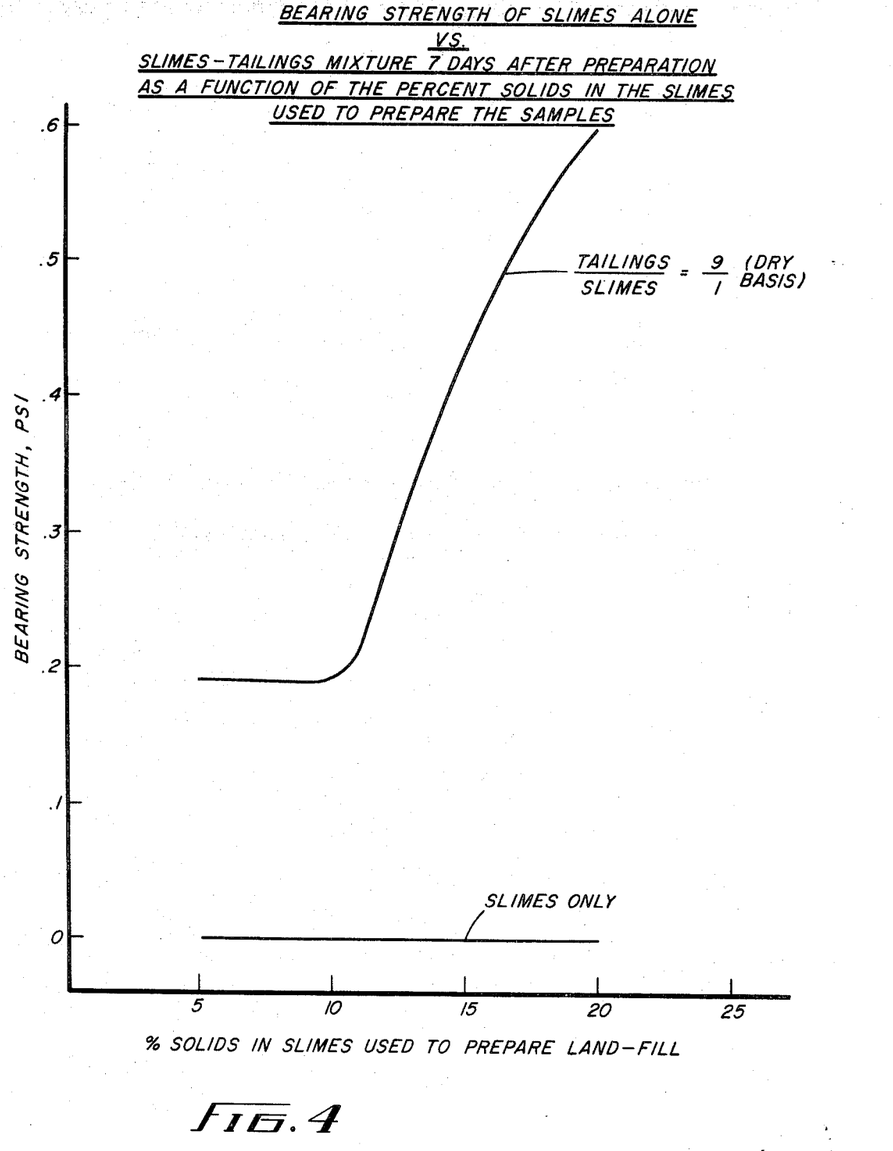

It has also been found that if the solids content of the slimes which are admixed with the tailings fall within a prescribed critical range and if a prescribed amount of tailings is employed, the resultant reconstituted slimes-tailings land-fill composition possesses sufficient fertility to support plant life and, moreover, possesses acceptable bearing strength. More particularly, such a land-fill composition results when slimes having a solids content of between about 10% and 25% by weight, and preferably 11% to 15%, are admixed with tailings in sufficient amount to provide from about 60 to 99%, and preferably 60–70%, by weight (dry basis) tailings in said mixture. The criticality of the solids content of the slimes is best seen in FIG. 4 which is discussed in greater detail hereinbelow.

Where the slimes have a solid concentration below about 10% prior to admixture with the tailings, tailings trickle through the mixture, with most of the tailings forming as a layer in the bottom of the disposal area. The slimes are simply displaced and rest on top of the tailings. Where the slimes have a solids content which exceeds 25%, the tails bridge across the slimes surface and a jelly-like mass remains trapped below the tails, resulting in nothing more than capping the slimes. In both instances, the resulting slimes-tailings mixture is unsuitable for use in land reclamation.

If the resulting mixture contains more than about 99% tailings, the land-fill composition lacks the requisite fertility and moreover would provide for only minimal utilization of the waste slimes. If the resulting mixtures contain less than about 60% tails, the land-fill composition lacks sufficient bearing strength for effective land reclamation.

The tails can be deposited on the surface of the slimes and will mix by gravity; they can similarly be admixed with the slimes and will remain suspended therein. A variety of techniques for mixing the slimes and tailings will be apparent to those skilled in the art. Additional techniques for carrying out the mixing operation are provided hereinbelow. Slimes of the requisite solids content and the prescribed amount of tailings can be admixed and then deposited into a suitable excavation, dammed site, or other suitable disposal area wherein provision is made to collect or otherwise dispose of the water released from the slimes.

Similarly, tailings may be deposited onto the surface of a pre-existing slimes pond wherein the slimes have settled to a solids content of 10 to 25%. The tails will work their way down into the slimes and will remain suspended in the slimes to form a firm fertile land-fill composition.

In yet another embodiment, tailings and slimes (not necessarily containing 10 to 25% solids) are admixed to produce a slurry which is then discharged into an excavation. After discharge, the slimes tend to separate and flow away from the tailings. As these separated slimes settle to the required solids content of 10 to 25%, the slimes-tailings mixture is discharged onto these settled slimes; the tailings contained in the discharged mixture mix with the settled slimes while the slimes in the discharged mixture separate and flow away from the tailings and settle to a 10 to 25% solids level before they in turn are covered by the gradually advancing discharge of slimes-tailings mixture. Similarly, a slimes-tailings mixture can be deposited into a drained slimes pond wherein the slimes are already at a 10 to 25% solids level. A variety of other techniques for employing this invention will be apparent to those skilled in the art and are embraced within the scope of this invention.

It has been found that within a few hours after the slimes-tailings mixture is produced and deposited in the disposal site that it possesses sufficient bearing strength to support a man's weight. With a few (2 to 3) weeks, the mixture has sufficient bearing strength to support heavy equipment such as D–8 tractors. A somewhat longer time period is required to achieve a bearing strength within the mixture which is sufficient to support construction of buildings and dwellings.

It is also possible to add to the admixture of tailings and slimes varying amounts of substituents such as overburden from the ore mining operation and hydrated calcium sulfate without destroying the desirable properties of the land-fill composition. Overburden is that portion of the earth's crust which ordinarily covers the matrix wherein the mineral values are found. It is ordinarily removed by a drag-line or such to expose the mineral containing matrix. Hydrated calcium sulfate is frequently available as a by-product from wet process phosphoric acid manufacturing facilities which are often found in close proximity to phosphate mining operations. The hydrated calcium sulfate or overburden can be admixed with the slimes and tailings by a variety of conventional techniques.

This invention also relates to reconstituted fertile land-fill compositions having acceptable bearing strength. More particularly, it relates to a land-fill composition comprising:

(a) from about 6 to about 40 parts by weight on a dry basis of slimes;

(b) from about 60 to about 94 parts by weight on a dry basis of tailings; and (c) water in amount sufficient to provide a moisture content of from about 15% to 30% based on total composition weight (wet basis)

wherein at least about 95% by weight on a dry basis of the solid particles of said composition have a particle size of minus 16 mesh, i.e. less than 1000 microns.

The above composition preferably contains about 30–40 parts slimes, about 60–70 parts tailings, a moisture content of about 15 to 25%, and at least 97% of the solids having a particle size of minus 16 mesh.

The above described composition may also contain from about 1 to about 50 parts by weight on a dry basis of hydrated calcium sulfate. In such cases, from 1 to 40 parts of slimes and from about 60 to 99 parts of tailings may be employed. The term "hydrated calcium sulfate" includes gypsum, or calcium sulfate dihydrate ($CaSO_4 \cdot 2H_2O$), and calcium sulfate hemihydrate ($CaSO_4 \cdot \frac{1}{2}H_2O$). When composition contains hydrated calcium sulfate, a preferred composition will contain, on a dry basis, from about 10–20% by weight slimes, 50–70% by weight tailings, and 20–30% by weight hydrated calcium sulfate, with a preferred water content of 15 to 25%.

Hydrated calcium sulfate is often available in the vicinity of the phosphate rock processing plant since the rock plant is often integrated with a wet process phosphoric acid plant. It is known that $CaSO_4 \cdot 2H_2O$ or $$CaSO_4 \cdot \tfrac{1}{2} H_2O$$

depending on the process used, is a waste product of wet process phosphoric acid manufacture. This hydrated calcium sulfate can be pumped to the slimes-tailings disposal area as an aqueous slurry typically containing up to 20% solids. This slurry can be either the waste slurry effluent from the phosphoric acid plant itself or it can be prepared by repulping dewatered hydrated calcium sulfate. In either case, the pH of the slurry will be acidic, i.e. pH of 1–3. Since it is desirable that the water supply of the phosphate rock processing plant be maintained on the alkaline side, it will usually be necessary to adjust the pH of the slurry of 7–8 using lime, sodium hydroxide, or other suitable means so as to prevent lowering of the pH of the rock plant water supply when the slurry is mixed with the slimes and tailings. The hydrated calcium sulfate slurry can be mixed with the slimes-tailings mixture by injecting the slurry into the pipeline carrying the slimes-tailings mixture to the disposal site, or it can be used, along with the slimes, to repulp dewatered tailings to form the mixture of slimes, tailings, and hydrated calcium sulfate. Other techniques for admixing the hydrated calcium sulfate with the slimes and tailings will be apparent to those skilled in the art.

DESCRIPTION OF THE PREFERRED EMBODIMENTS

Figure 1:
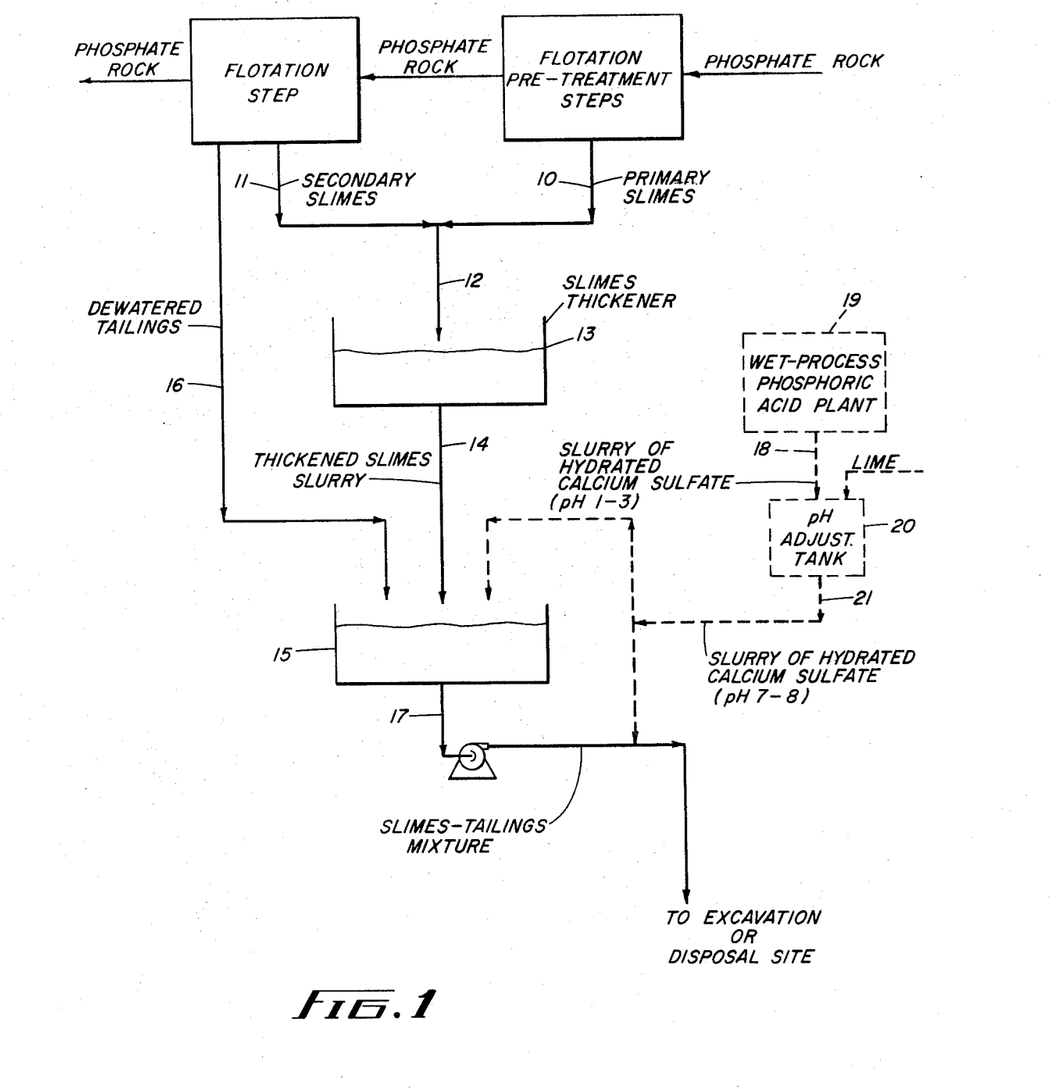
FIG. 1 is a schematic flowsheet of a preferred process of the invention.

FIG. 1 is a schematic flowsheet of a preferred process of this invention. Referring to FIG. 1, the waste primary slimes 10 from the flotation pretreatment process steps in a phosphate ore processing plant and the waste secondary slimes 11 from the flotation step itself are admixed to form a dilute aqueous suspension of slime solids 12 which typically contains 1–2% solids. Usually about 90% of the total slimes produced are primary slimes with the remaining 10% being secondary slimes. All or a portion of the primary or secondary slimes may be used to produce stream 12. It is, of course, possible to use only the primary or only the secondary slimes to make up stream 12 if desired. Slimes stream 12 is fed to thickener 13 where it is typically thickened for 20 to 50 hours, and preferably 22–26 hours, to produce a solids content in the slimes of about 3–6%. The thickener underflow 14 containing 3–6% solids and typically 3–4% solids, is then fed to tank 15 whereupon it is admixed with waste tailings 16 from the flotation step. Tailings 16 are dewatered and typically contain about 20% water. The thickened slimes stream 14 is used to repulp tailings 16 in tank 15 to produce an aqueous slurry of a mixture of slimes and tailings 17 which is then pumped out of tank 15 to the waste disposal excavation or other suitable land reclamation site. The respective quantities of streams 14 and 16 fed to tank 15 will, of course, depend on several factors such as, for example, the ratio of tailings to slimes solids desired in the land fill composition and provision of sufficient water to render stream 17 pumpable to the excavation site. The required proportions of tailings to slimes in the land-fill compositions have been discussed hereinabove. Generally, stream 17 will contain a solids content of from about 15 to 45%, and preferably, 40 to 45%.

If it is desired to add hydrated calcium sulfate to the land-fill composition, an aqueous slurry of hydrated calcium sulfate 18 from the wet process phosphoric acid plant 19 or from the calcium sulfate ponds of such a plant is fed to a suitable vessel 20 where the acid pH of stream 18 is rendered alkaline by treatment with lime. The alkaline calcium sulfate slurry 21 is thereupon added to tank 15 where, along with the slimes stream 14, it serves to repulp tailings 16. Optionally stream 21 can be injected directly into the pipeline which conducts the slimes-tailings mixture 17 to the excavation site where, due to the continuous churning and mixing which occurs in the stream flowing in the pipeline, the calcium sulfate admixes with the slimes-tailings mixture. The quantity of stream 21 required will, of course, depend on how much hydrated calcium sulfate is desired in the land fill composition. Stream 21 can contain a wide range of solids content, usually up to about 20%.

The slimes-tailings mixture 17 is then pumped to an excavation which is typically a ditch a half to one mile or longer in length, 40 to 60 feet deep, 30 to 50 feet wide at the base and from 100 to 150–200 feet wide at the top. Mixture 17 is introduced at one end of the ditch. Once mixture 17 is deposited in the ditch, a substantial portion of the slimes tend to physically separate from the tailings and flow away from the tailings. These slimes roll on ahead of the tailings accumulating ahead of the tailings where they are then given the opportunity to concentrate to the required solids content of 10 to 25%. Almost as soon as mixture 17 ies deposited in the ditch, water is rapidly released from the mixture and proceeds by gravity down the ditch until it eventually reaches a dam at one end of the ditch. This dam will typically have an overflow weir which directs the overflow from the accumulated water into the fresh water return canal of the phosphate rock processing plant. After those discharged slimes which have accumulated ahead of the tailings have become concentrated to the required 10 to 25% solids level, the discharge pipe for mixture 17 is advanced to discharge mixture 17 onto these concentrated slimes. As the mixture is discharged, most of the slimes discharged again separate from the tailings in the mixture and flow on ahead of the tailings. The discharged tailings, however, settle by gravity into the concentrated slimes and mix with these slimes to form a fertile land fill composition of acceptable bearing strength. In effect, these concentrated slimes remix with the slimes-tailings mixture as the deposited mixture advances along the ditch. The discharged slimes-tailings mixture is gradually advanced along the length of the ditch until the ditch is substantially filled with the land-fill composition. Where desired, low check dams can be placed at intervals across the ditch to impede slimes flow and assist in concenrating the slimes solids to the 10% to 25% level where the tailings will mix with the slimes instead of merely displacing them or capping them.

It should also be noted that despite the fact that substantial portions of the slimes flow away from the tailings when the slimes-tailings mixture is deposited in the ditch, the tailings will retain as much as 1 to 3% by weight on a dry basis of the slimes even at the surface of the deposited tailings. This clay provides nutrients for plant growth and also acts as a sponge to retain the moisture necessary for plant growth and erosion inhibition.

In another embodiment, land-fill is achieved by draining the water from a slimes disposal area and pumping a slimes-tailings mixture, prepared as previously described, to one end of the disposal area. The advancing mixture has a rolling motion which increases mixing with the slimes and brings about the release of substantial amounts of water ultimately providing a firm fertile soil.

In yet another embodiment, slimes from a previously employed disposal site, which have settled to between 10% and 25% solids, preferably 15% to 25% solids, are pumped to a mixer such as a blunger, pug mill, or the like, where from 60 to 99%, and preferably 60 to 70%, by weight of tailings are mixed with the slimes whereupon the resultant mixture is deposited in an excavation from which released water can drain. The deposited mixture is firm and fertile.

The following examples are provided to further illustrate the invention.

EXAMPLE 1

Enhanced water release, increased solids content, marked improvement in the angle of repose and a significant increase in the bearing strength of slimes treated in accordance with the present invention are demonstrated by the followig tests.

Five gallon samples of plants slimes from a Florida phosphate plant, containing 2.15% solids, are poured into 3′ x 4′6″ wooden troughs and permitted to settle Percent solids in the slime portion, precent clear water, angle of repose and bearing strength of the solids is determined on a daily basis.

Percent solids in the slimes is determined by evaporated of moisture from a weighed sample. This determination is made by heating the sample to 140° C. until a constant weight is obtained and calculating the solids content therefrom.

Percent clear water is determined by recovering the water from the trough in which the slimes sample is stored.

Angle of repose is the angle of incline of the stacked slimes determined by measuring (1) the distance from the leading edge of the slimes to the point of introduction, (2) measuring the depth of the slimes at the point of slimes introduction and (3) calculating the angle from the leading edge to the top of the stacked slimes.

Bearing strength of the slimes is determined by placing a cylindrical container of known area on the surface of the slimes and loading the container with fine shot. When the container breaks through the surface of the slime the container is removed, weighed and the bearing strength of the sample determined.

Specified amounts of dry tailings are added to various slimes samples at spaced time intervals to determine what effect addition of the tailings to the slimes has upon the various properties being studied.

Data obtained are presented in Tables I and II below. A portion of the data is represented graphically in FIGS. 2 and 3. The data clearly show that each admixture of tailings with slimes not only significantly enhances the rate of dewatering of the slimes but also results in the recovery of substantial additional amounts of clear water from the slimes. For example, the data of FIG. 2 indicate that whereas a dilute slimes (2% solids) had concentrated only to about 8% solids in 60 days, when tailings were added to the dilute slimes, a solids level of about 20% was achieved in somewhat less than 60 days. Similarly, while only about 70% of the water present in the dilute slimes was recovered as clear water after 60 days, 90% was recovered as clear water in the same time period in the case where tailings were added to the dilute slimes sample. This represents almost a 29% increase in the amount of water recovered from the slimes.

A comparison of the bearing strength data of Tables I and II reveals that slimes have substantially no bearing strength whatever whereas slimes-tailings mixtures have appreciable bearing strengths provided that the slime used to prepare the mixture had a solids content of about 10% by weight or higher.

Results substantially similar to those obtained above were observed when the Florida plant slimes were replaced with Sydney Primary Slimes.

TABLE I.—SLIMES SETTING TESTS

| Sample | Time (days) | Percent solids of slimes portion | Percent clear water | Angle of repose, degree | Bearing strength of solids (lb/sq. in.)[1] |
|---|---|---|---|---|---|
| Plant slimes | 0 | 2.15 | 0 | 1 | .02 |
| Do | 1 | 5.50 | 61 | 1 | .02 |
| Do | 2 | 6.15 | 65 | 1 | .02 |
| Do | 3 | 6.52 | 67 | 1 | .02 |
| Do | 4 | 6.72 | 68 | 1 | .02 |
| Do | 5 | 6.72 | 68 | 1 | .02 |
| Do | 6 | 6.95 | 69 | 1 | .02 |
| Do | 7 | 6.95 | 69 | 1 | .02 |
| Do | 8 | 6.95 | 69 | 1 | .02 |
| Do | 9 | 6.95 | 69 | 1 | .02 |
| Do | 10 | 7.17 | 70 | 1 | .02 |
| Do | 20 | 7.40 | 71 | 1 | .02 |
| Do | 30 | 7.70 | 72 | 1 | 0.02 |
| Do | 64 | 8.00 | 73 | 1 | 0.02 |

[1] Weight required to break through surface.

TABLE II.—SLIMES-TAILINGS MIXTURE, SETTLING TESTS

| Sample | Percent of tailings added [1] | Time (days) | Percent solids of slimes portion | Percent clear water | Angle of repose, degrees | Bearing strength of solids (lb./sq. in.)[2] |
|---|---|---|---|---|---|---|
| Plant slimes | 0 | 0 | 2.15 | 0 | 1 | .02 |
| Do | 0 | 9 | 6.95 | 69 | 1 | .02 |
| Do | 2 | 10 | 7.17 | 70 | 1 | .02 |
| Do |  | 11 | 8.30 | 74 | 1.25 | .02 |
| Do |  | 16 | 10.2 | 79 | 2.25 | .03 |
| Do |  | 17 | 10.7 | 80 | 2.25 | .03 |
| Do | 2 | 24 | 11.3 | 81 | 4.00 | .15 |
| Do | 2 | 30 | 15.4 | 86 | 6.00 | .20 |
| Do |  | 64 | 19.5 | 89 | 20.0 | 4.5 |

[1] Ratio of tailings to slime—solids dry basis.
[2] Weight required to break through surface.

EXAMPLE 2

Glass graduated cylinders are filled with plant slimes containing approximately 2% solids. The slimes are permitted to settle and, as the solids concentration increases, tailings are added to determine their effect on the settled slimes.

Tailings added to the slimes having from about 2 to 10% solids settle downward through the slimes and stratify at the bottom of the cylinder.

Tailings added to slimes having from 10 to 25% solids mix with the slimes and remain suspended therein.

Tailings added to slimes having greater than 25% solids remain on the surface of the slimes and bridge across the cylinder. Thus, to obtain desired admixture of the tailings and slimes, without utilizing a mixing device, it is essential to concentrate the slimes solids to between about 10% and 25%, and preferably 11% to 15%, prior to loading with tailings or a tailings-slimes mixture.

To utilize this discovery in the reclamation of land, 1% to about 40% (by dry weight) of slimes having 10% to 25% solids are mixed with about 60% to 99% by weight (dry basis) of dewatered waste tailings from the phosphate flotation system to form a land-fill composition. Water which drains from the resultat mixture is removed. The mixtures are placed in outdoor plots and planted with Bermuda grass. A firm soil with good grass coverage is obtained.

EXAMPLE 3

In the following land reclamation test, a cut or ditch, approximately 8,500 feet long and averaging 38 feet in depth and 136 feet in width at the otp, was filled with approximately 1,219,038 tons of plant tailings and 87,382 tons of plants slimes in accordance with the process of this invention. Across the exit end of the cut there was erected a dam and an overflow weir leading to the fresh water return canal of the phosphate rock processing plant. Tailings from the phosphate processing plant were pulped with return water and pumped to the cut where they were deposited as land fill. Approximately 3,400 feet of the cut was filled in this manner before the process of the invention was then put into use. The waste diposal area at this time has good bearing strength but is not fertile.

At this point, the plant slimes thickener was run to produce maximum underflow density. The thickened slimes underflow containing about 3.5–4.0% solids and typically 3 to 6% solids was used to repulp the dewatered plant tailings and the resulting mixture was then pumped to the disposal cut. The mixture contained a solids content of about 15–18% by weight at this time. Due to the nature of the mixture, the slimes tended to separate and run ahead of the tailings after the mixture was discharged into the cut. However, analysis of the soil samples showed that at least about 1% to 3% of slimes (dry weight) are trapped within the tailings despite separation of most of the slimes. This improved fertility and compaction as the clay contained in the slimes retains a substantial amount of moisture.

Since some initial separation of the slimes was evident small check dams were placed across the cut at intervals along its length. The dams impeded the advance of the densifying slimes permitting the clear water to proceed down the cut. When the separated slimes thickened to about 10% to 15% solids, mixing of these thickened slimes with the now advancing slimes-tailings mixture occurred. Such mixing improved the release of water from the slimes. This is evidenced by the fact that by utilizing the process of the present invention, some 71 million gallons of water was recovered that would not have been recovered by using conventional tailings and slimes disposal systems. The 1,219,038 tons of tailings processed would have required 560 acre feet (at 100 lbs./ft.³) and the 87,382 tons of slimes treated would have required 252 acre feet, or a total disposal area of 812 acre feet (at 22.5% solids, 1.14 sp.g.). The finished fill in this test actually required 595 acre feet or 217 acre feet less than would conventionally be employed. Thus, an additional 217 acre feet of water over and above that which would be recovered by conventional procedures was recovered by the process of the present invention. This is equivalent to 70,709,667 gallons of additional water released and recovered.

After the cut was completely filled to ground level, six borings were made. The results are reported below in Table III as percent slimes (i.e., −150 mesh material), and bearing strength. The results indicate that the land-fill possesses good bearing strength.

The entire site has been seeded with Bermuda grass and good growth is evident. The land-fill has good bearing strength and supported a variety of heavy pieces of equipment such as, for example, D–8 tractors, within very short periods after the filling of the cut was completed.

TABLE III

| Boring 1 | | | Boring 2 | | |
|---|---|---|---|---|---|
| Depth | Percent passing 150 mesh | Avg. B.S.[1] (tons/ sq. ft.) | Depth | Percent passing 150 mesh | Avg. B.S.[1] (tons/ sq. ft.) |
| 0.0–3.0 | 4.7 | 0.75 | 0.0–3.0 | 2.2 | 0.75 |
| 3.0–6.0 | 2.5 | 3.35 | 3.0–6.0 | 3.0 | 1.40 |
| 6.0–9.0 | 2.4 | 2.21 | 6.0–9.0 | 4.1 | 0.26 |
| 9.0–12.0 | 1.5 | 1.72 | 9.0–12.0 | 3.9 | 0.59 |
| 12.0–15.0 | 2.4 | 2.38 | 12.0–15.0 | 22.3 | 0.42 |
| 15.0–18.0 | 2.1 | 1.08 | 15.0–17.0 | 3.2 | 1.08 |
| 18.0–21.0 | 4.6 | 0.91 | 17.0–18.5 | 12.2 | 0.26 |
| 21.0–25.5 | 7.9 | 1.40 | 18.5–22.0 | 7.4 | 0.26 |
| 25.5–27.0 | 7.0 | 1.24 | 22.0–25.0 | 11.8 | 0.26 |
| 27.0–30.0 | 8.1 | 1.75 | 25.0–28.0 | 21.0 | 0.51 |
| 30.0–33.5 | 14.9 | 0.34 | 28.0–31.0 | 17.9 | 1.08 |
| 33.5–35.0 | 16.9 | 2.13 | 31.0–34.0 | 24.9 | 1.32 |
| Boring 3 | | | Boring 4 | | |
| 0.0–3.0 | 5.0 | 2.54 | 0.0–3.0 | 4.1 | 2.78 |
| 3.0–6.0 | 2.5 | 3.43 | 3.0–6.0 | 4.0 | 5.30 |
| 6.0–9.0 | 1.3 | 1.73 | 6.0–9.0 | 1.5 | 2.30 |
| 9.0–12.0 | 1.7 | 0.43 | 9.0–12.0 | 1.9 | 1.24 |
| 12.0–15.0 | 2.0 | 0.51 | 12.0–15.5 | 3.2 | 0.50 |
| 15.0–16.5 | 6.6 | 0.42 | 15.5–19.0 | 5.3 | 0.75 |
| 16.5–18.0 | 3.9 | 0.75 | 19.0–22.5 | 3.9 | 0.51 |
| 18.0–21.0 | 8.2 | 0.43 | 22.5–25.5 | 19.0 | 1.42 |
| 21.0–24.5 | 8.6 | 0.59 | 25.5–28.5 | 10.0 | 3.43 |
| 24.5–28.0 | 9.1 | 0.70 | 28.5–31.5 | 9.3 | 3.05 |
| 28.0–32.0 | 33.2 | 0.10 | 32.0–33.5 | 13.1 | 3.02 |
| 32.0–35.5 | 31.6 | 1.24 | 33.5–36.4 | 6.1 | 4.81 |
| 35.5–39.1 | 18.9 | 1.56 | | | |
| Boring 5 | | | Boring 6 | | |
| 0.0–3.0 | 2.3 | 2.13 | 0.0–3.0 | 6.0 | 1.89 |
| 3.0–6.0 | 2.0 | 2.38 | 3.0–6.0 | 4.1 | 3.52 |
| 6.0–9.0 | 3.2 | 2.21 | 6.0–9.0 | 7.2 | 3.53 |
| 9.0–12.0 | 4.7 | 1.00 | 9.0–12.0 | 6.1 | 3.27 |
| 12.0–15.0 | 3.0 | 0.42 | 12.0–15.0 | 9.5 | 3.51 |
| 15.0–18.5 | 9.9 | 0.26 | 15.0–18.0 | 4.7 | 1.56 |
| 18.5–21.5 | 9.2 | 0.26 | 18.0–22.0 | 2.9 | 0.67 |
| 21.5–25.5 | 12.3 | 0.42 | 22.0–25.5 | 21.5 | 1.97 |
| 25.5–29.0 | 34.0 | 1.77 | 25.5–28.5 | 6.0 | 1.24 |
| 29.0–32.0 | 7.1 | 1.00 | 28.5–32.0 | 23.1 | 1.07 |
| 32.0–36.5 | 18.9 | 2.30 | | | |

[1] Bearing strength.

EXAMPLE 4

Marked improvement in the bearing strength of slimes thickened to more than 10% solids and admixed with tailings is demonstrated by the following tests.

In these tests, slimes samples having 20.1% solids were weighed into buckets and admixed with water to give a variety of test samples having from 5.0% to 20.1% solids concentrations. To these samples were added sufficient quantities of tailings to provide mixtures containing from about 88 to 90% by weight of tailings on a dry basis. The mixtures were then poured into wooden troughs approximately 18 inches wide, four and one-half feet long and six inches deep. The test samples were permitted to settle and free water was permitted to drain from the troughs.

Three, six and seven days after the test was initiated, bearing strengths of the settled materials were determined. Three different test devices were employed, (1) a sheet metal truncated pyramid-shaped box having a 9 square-inch bearing surface, (2) a cylindrical bottle with the bottom removed and a bearing surface area of 2.8193 square inches and (3) a circular plastic cap having a bearing surface of 7.580 square inches.

The slimes having a solids content of 20.10% by weight had the following screen analysis (dry basis).

| | Mesh | | | | | | | | |
|---|---|---|---|---|---|---|---|---|---|
| | +12 | −20 | −35 | −48 | −65 | −100 | −150 | −200 | −325 |
| Percent | | | | | 100 | 99.85 | 99.65 | 99.20 | 98.30 |

The tailings having a solids content of 78.00% by weight had the following screen analysis (dry basis).

| | Mesh | | | | | | | |
|---|---|---|---|---|---|---|---|---|
| | +12 | −20 | −35 | −48 | −65 | −100 | −150 | −200 | −325 |
| Percent | 1.2 | 98.8 | 85.1 | 53.1 | 19.0 | 8.0 | 3.4 | | |

Pertinent data on the batches prepared are listed below:

| Batch Number | Percent solids in slimes | Slimes Pounds solids | Pounds water initial | Pounds water added | Tailings, dry pounds | Batch total wt. (lbs.) |
|---|---|---|---|---|---|---|
| 1 | 5 | 0.60 | 2.38 | 9.00 | 5.26 | 17.24 |
| 2 | 8 | 0.60 | 2.38 | 4.50 | 5.26 | 12.74 |
| 3 | 10 | 1.20 | 4.76 | 6.02 | 10.52 | 22.50 |
| 4 | 12 | 1.20 | 4.76 | 4.02 | 10.52 | 20.50 |
| 5 | 14 | 1.80 | 7.14 | 3.89 | 16.17 | 29.00 |
| 6 | 16 | 1.80 | 7.14 | 2.29 | 16.17 | 27.40 |
| 7 | 18 | 1.80 | 7.14 | 1.04 | 16.17 | 26.15 |
| 8 | 20.1 | 1.80 | 7.14 | 0 | 16.17 | 25.11 |

Control sample batches, or blanks containing no tailings, were prepared with slimes to water ratios as in Samples Numbers 1, 3, 5, 6, 7 and 8.

Except for controls, all sample containers were covered until after the initial testing whereupon they were uncovered for the duration of the other tests. Controls were left open. Temperatures ranged from 70–85° F.

Results of bearing strength tests are shown below in Table IV:

TABLE IV

Bearing strength (p.s.i.) test results

| Sample | Time, days | Percent solids in slimes | | | | | | | |
|---|---|---|---|---|---|---|---|---|---|
| | | 5 | 8 | 10 | 12 | 14 | 16 | 18 | 20.1 |
| Slimes tailings mixture | 3 | .00174 | .0305 | .0384 | .0488 | .0646 | .0948 | .1367 | .2173 |
| | 6 | .1046 | .1345 | .1521 | .2009 | .2149 | .4211 | .4432 | |
| | 7 | .1874 | [1].1989 | .1808 | [1].3258 | .3405 | .5396 | .5607 | .5990 |
| Controls: No tailings added | 3 | | | | | | .0011 | .0015 | .0020 | .0041 |
| | 6 | | | | | | .0014 | .0020 | .0030 | .0041 |
| | 7 | | | | | | .0021 | .0027 | .0030 | .0040 |

[1] Average value.

The 7-day bearing strengths of the slimes-tailings mixtures are depicted graphically in FIG. 4 wherein it can be clearly seen that it is only when the slimes which are admixed with the tailings have a solids content of at least about 10% that the resulting slimes-tailings land-fill composition has acceptable bearing strength. The dramatic and unexpected increase in bearing strength which occurs at a slimes solids content of 10% is readily apparent from an inspection of FIG. 4.

The data of Table IV also indicate that the bearing strength of the slimes-tailings mixtures increases significantly as time progresses such increase being due, in all likelihood, to the enhanced dewatering of the slimes which is occurring by virtue of the addition of tailings to the slimes in accordance with the process of this invention.

EXAMPLE 5

A slimes-tailings mixture containing about 17 parts slimes (dry basis) and 58.6 parts tailings (dry basis) is prepared substantially as described in FIG. 1. A gypsum ($CaSO_4 \cdot 2H_2O$) slurry having a solids content of about 20% by weight and a pH of about 2 is treated with sufficient lime or sodium hydroxide to adjust the pH thereof to 7–8. The gypsum slurry is pumped to the discharge pipe carrying the slimes-tailings mixture and injected into this pipe in sufficient quantity to provide the following land-fill composition on a dry basis:

slimes: 17 parts
tailings: 58.6 parts
gypsum: 24.4 parts

The above mixture is then transported by pumping to the discharge cut. This mixture provides a means of increasing the bearing characteristics of the soil and also provides a composition that will support plant life by the addition of soil supplement (calcium). While the composition given above is what would be considered typical, the amount of the constituents could be varied with respect to the amount of calcium sulfate dihydrate or hemihydrate. Gypsum could also be added to the slimes in the thickener before the tailings are mixed with slimes in the pipe line, or at any other location downstream from the hydroseparators of the phosphate rock processing plant. Gypsum could also be transported separately to the discharge cut and added concurrently with the tailings and slimes mixture.

We claim:

1. A process for producing a fertile land-fill composition comprising the steps of mixing waste slimes and tailings from a phosphate rock processing operation with hydrated calcium sulfate, said slimes comprising an aqueous suspension of solid particles at least 99% by weight (dry basis) of which have a particle size smaller than 105 microns (minus 150 mesh); said tailings comprising solid particles 95% by weight (dry basis) of which have a particle size in the range of 105 to 1000 microns (−16 to +150 mesh) the particle size of a major portion of the tailings being larger than about 65 mesh; wherein the relative quantities of slimes and tailings are from 1 to 40 parts by weight (dry basis) to about 60 to 99 parts by weight (dry basis), respectively, and a sufficient amount of the hydrated calcium sulfate is employed to provide from about 1 to about 50 parts by weight (dry basis) of the fertile land-fill composition produced; and, withdrawing the water released from said slimes, tailings and hydrated calcium sulfate to produce the fertile land-fill composition.

2. A process according to claim 1 wherein the hydrated calcium sulfate is added in the form of an aqueous slurry.

3. A process according to claim 2 wherein the relative quantities of slimes, tailings, hydrated calcium sulfate and water are adjusted to produce a fertile land fill composition containing, on a dry basis, from about 10 to 20% slimes by weight, from 50 to 70% tailings by weight, from 20 to 30% hydrated calcium sulfate by weight and from 15 to 25% water by weight.

4. A process according to claim 2 further comprising the step of adjusting the pH of the slurry to between 7 and 8 prior to the addition of said slurry to said slimes and tailings.

5. A process according to claim 4 wherein said adjustment is made by the addition of a compound selected from the group consisting of lime and sodium hydroxide, to said slurry.

6. A fertile land-fill composition produced by the process of claim 1.

7. A fertile land-fill composition produced by the process of claim 2.

8. A fertile land-fill composition produced by the process of claim 3.

9. A fertile land-fill composition produced by the process of claim 4.

10. A fertile land-fill composition produced by the process of claim 5.

11. A land-fill composition comprising:

(a) from about 6 to about 40 parts by weight on a dry basis of slimes, (b) from about 60 to about 90 parts by weight on a dry basis of tailings, and (c) water in an amount sufficient to provide a moisture content of from about 15% to 30% based on total composition weight (wet basis) wherein at least about 95% by weight on a dry basis of the solid particles of the composition have a particle size of minus 16 mesh, i.e., less than 1000 microns.

12. A land-fill composition according to claim 11 wherein the slimes and tailings are derived from a phosphate rock processing plant.

13. A land-fill composition according to claim 12 wherein the slimes contain a solids content of between 11% to 15% by weight and the tailings are added in an amount sufficient to produce a slimes-tailings mixture which contains on a dry basis from about 60% to 70% by weight (dry basis) tailings.

14. A land-fill composition according to claim 13 wherein the slimes-tailings mixture contains above about 67% by weight (dry basis) tailings.

References Cited

UNITED STATES PATENTS

| | | | |
|---|---|---|---|
| 3,451,788 | 6/1969 | Smith | 210—44 X |
| 3,523,889 | 8/1970 | Eis | 210—46 X |
| 3,680,698 | 8/1972 | Liu et al. | 210—46 |

JOHN ADEE, Primary Examiner

U.S. Cl. X.R.

71—63, 64 C, 64 SC, 64 JC; 210—83